United States Patent [19]
Viliesid

[11] Patent Number: 5,995,145
[45] Date of Patent: Nov. 30, 1999

[54] IMAGE CAPTURE APPARATUS FOR SELECTIVELY CAUSING A STEPPED REDUCTION IN VIDEO IMAGE SIGNAL VALUES

[75] Inventor: Nicholas Alfred William Viliesid, Bramley, United Kingdom

[73] Assignee: Sony Broadcast & Communications Limited, Basingstoke, United Kingdom

[21] Appl. No.: 08/167,617

[22] Filed: Dec. 15, 1993

Related U.S. Application Data

[63] Continuation of application No. 07/842,644, Feb. 27, 1992, abandoned.

[30] Foreign Application Priority Data

Apr. 30, 1991 [GB] United Kingdom ................... 9109391

[51] Int. Cl.$^6$ .................................................. H04N 5/235
[52] U.S. Cl. ........................... 348/362; 348/364; 348/342
[58] Field of Search .................................... 348/362, 363, 348/364, 365, 366, 342, 369, 691, 693, 360; 354/409, 422, 430; 396/89, 96, 101; H04N 5/238

[56] References Cited

U.S. PATENT DOCUMENTS

| | | | |
|---|---|---|---|
| 3,818,127 | 6/1974 | Walter | 348/693 |
| 4,158,859 | 6/1979 | Kerbel | 348/229 |
| 4,535,364 | 8/1985 | Hirobee | 358/218 |
| 4,584,610 | 4/1986 | Mizokami et al. | 358/228 |
| 5,019,911 | 5/1991 | Okino et al. | 358/213.19 |
| 5,070,405 | 12/1991 | Ejima et al. | 358/209 |
| 5,075,775 | 12/1991 | Kawaoka et al. | 358/209 |
| 5,339,163 | 8/1994 | Homma et al. | 348/363 |

FOREIGN PATENT DOCUMENTS

| | | | |
|---|---|---|---|
| 60-136480 | 7/1985 | Japan | H04N 5/238 |
| 63-123278 | 5/1988 | Japan | H04S 5/235 |
| 3-070274 | 3/1991 | Japan | H04N 5/238 |
| 3-70274 | 3/1991 | Japan | H04N 5/238 |

*Primary Examiner*—Tuan Ho
*Attorney, Agent, or Firm*—Frommer Lawrence & Haug, LLP.; William S. Frommer

[57] ABSTRACT

An image capture apparatus (eg. a video camera) for producing video image signals includes an image sensor for producing image signals having signal values representative of radiation intensity incident on respective positions of the sensor. The apparatus is able to identify an area of the sensor at which the incident intensity exceeds a predetermined intensity and to cause a stepped reduction in the image signal values corresponding to said area. The apparatus enables a range of intensity levels above a predetermined maximum to be translated or shifted to within a range which can be accommodated, for example by a broadcast television system, in a manner equivalent to applying a negative pedestal to that range of intensity levels. Preferably, for detecting an area of the sensor at which the incident intensity exceeds a predetermined intensity, a sense array additional to the image sensor is provided for producing sample signals representative of the radiation incident on the sensor at corresponding image positions. Various specific examples of the apparatus are described.

27 Claims, 7 Drawing Sheets

IMAGE CAPTURE APPARATUS FOR SELECTIVELY CAUSING A STEPPED REDUCTION IN VIDEO IMAGE SIGNAL VALUES

This application is a continuation of application Ser. No. 07/842,644, filed Feb. 27, 1992 now abandoned.

BACKGROUND OF THE INVENTION

1. Field of the Invention

The invention relates to image capture apparatus such as a video camera for producing video image signals and to a programmable filter and to an image sensor suitable for use with such an image capture apparatus.

2. Description of the Prior Art

Conventional television broadcasting systems are designed to process images containing an exposure range of the order of four to five iris stops. The image sensor of most television cameras for capturing images for use in television broadcasting systems are, in fact, capable of sensing images having a greater exposure range than four to five iris stops. However, because of the limitations of the broadcast systems, any light entering the image sensor outside this range, although detected, will not be recorded or transmitted.

It has been suggested to apply compression curve techniques, similar to those used on film, to video television images. The compression curve techniques apply a scaling factor to image intensities above a certain level in order to produce signals lying within an exposure range which can be accommodated in television broadcast systems. However, the use of compression curves does not provide an acceptable solution in many cases. For example, many images comprise ranges of intensity values separated by a step rather than a single homogenous range of intensity values. An example of this would be the classical back lighting situation where the foreground of an image lies within a room and the background lies outside of the room viewed, for example, through a window. Situations of this type can be accommodated by human intervention, for example by a cameraman putting in a selective or gradient type filter or by means of double exposure and keying techniques in post production. These techniques are applicable as long as the scene is static. However, the problems of accommodating such scenes are particularly acute where the camera is panned.

An international patent application with the publication number WO 90/01844 describes a video imaging apparatus having a multiplicity of photo sensitive detectors arranged in an array and adaptive control circuitry for determining integration times for the photosensitive detectors so that they operate in different operating ranges to provide enhanced dynamic ranges for the detectors. The signal values output by the detectors are then multiplied by factors inversely proportional to the integration times to produce an enhanced linear range of intensity values within the image with the relationship between the original intensity values of the viewed scene being maintained across the image. Conventional compression techniques are then applied to adapt this enhanced linear range of intensity values to one suitable for output from the apparatus to television equipment connected thereto. Another international patent application with the publication number WO 90/01845 describes an apparatus which comprises a plurality of cameras for producing a plurality of video images of a scene at different exposures levels and apparatus for processing the plurality of video images to produce a combined video image including image information from the plurality of video images to include enhanced detail at local areas therein. Both of these international patent applications deal with enhancing the dynamic range which can be sensed by the sensed elements of an image capture apparatus. In both cases the aim is to maintain the relationship between the original intensity values of the scene being viewed across the image. They employ conventional compression techniques to adapt the enhanced range to one suitable for output. However, they do not address the problem of producing an output video signal from an image capture apparatus where the incident light on the image sensor of the image capture apparatus is within the capability of that image sensor, but exceeds the exposure range which can be accommodated by television equipment connected to receive the output from the image capture apparatus.

An object of the invention is to provide an image capture apparatus such as a video camera for producing video image signals for a television system, which apparatus is able automatically to accommodate significant differences in image intensities.

SUMMARY OF THE INVENTION

In accordance with a first aspect of the present invention, there is provided image capture apparatus for selectively causing a stepped reduction in video image signal values comprising:

(i) an image sensor for producing image signals having signal values representative of radiation intensities incident on respective image sensor positions;

(ii) means for identifying respective areas of the sensor at which the incident intensity exceeds a predetermined intensity; and (iii) means for selectively causing a stepped reduction in the video image signal values, as output by the image capture apparatus, corresponding to said respective areas.

In an image capture apparatus (e.g. a video camera) in accordance with the invention therefore, the output from the apparatus can contain video signals for a range of intensity levels above a predetermined maximum which have been translated or shifted to within the range which can be accommodated, for example, by a broadcast television system. This is equivalent to applying a negative pedestal (i.e. pedestal or minimum picture signal level below that of the normal black level) to that range of intensity levels, with the result that the original relationship between intensity value inside and outside said area is not maintained, although the relationship between intensity values within said area and the relationship between intensity values outside said area are maintained.

Preferably, the means for detecting an area of the sensor at which the incident intensity exceeds a predetermined intensity comprises threshold detection means responsive to the image signal values output by the image sensor for detecting a signal value exceeding a predetermined value as indicative of an incident intensity exceeding the predetermined intensity.

Alternatively, however, the image capture apparatus can additionally comprise a sense array for producing sample signals representative of the radiation incident on the sensor at corresponding image positions, wherein the means for detecting an area of the sensor at which the incident intensity exceeds a predetermined intensity comprises threshold detection means responsive to sample values from the sense array to indicate an incident intensity exceeding the predetermined intensity. In this case, the image capture apparatus preferably includes a beam splitter in an optical path preceding the image sensor for diverting part of the incident radiation onto the sense array.

Attenuation means can be provided which are responsive to the threshold detection means selectively to apply a negative pedestal to image signal values representative of an incident intensity exceeding the predetermined intensity to give a stepped down image signal value representative of an intensity below the threshold. Preferably, the attenuation means is operative to pass unaltered an image signal representative of an image intensity below the predetermined intensity.

In a particular embodiment of image capture apparatus in accordance with the invention, the image sensor is a scanned sensor producing signals for a 2-D array of pixels, the image sensor comprising a plurality of output lines for respective pixel positions along a scan line, and wherein the threshold detection means comprises a plurality of threshold detectors associated with respective output lines and the programmable attenuation means comprises a plurality of attenuators associated with respective threshold detectors.

The image capture apparatus can be provided with storage means connected to the output of the attenuation means for storing the processed image signals.

In an alternative embodiment of image capture apparatus in accordance with the invention, the image sensor comprises an array of sense elements, the image integration time of which is controllable, the image capture apparatus comprising control means responsive to the threshold detection means indicating an incident image intensity exceeding the predetermined intensity selectively to step down the integration time of the sense element or elements at which the incident intensity exceeds the predetermined intensity.

In yet a further embodiment of the present invention, image capture apparatus in accordance with the invention can comprise a programmable optical filter interposed in the optical path preceding the image sensor, and control means for means causing the programmable optical filter to be set to a selected transmission coefficient during a calibration period when the image capture apparatus is not outputting an image signal, the control means being responsive to signals output by the threshold detection means during a calibration time to step down, for a subsequent active output period during which an image signal is output, the transmission coefficient of the filter at locations corresponding to areas of the sensed image at which the image intensity exceeds the predetermined intensity.

The programmable filter is preferably located between the image sensor and optical elements in the optical path. In this way, the programmable filter can be used to replace the usual filter wheel provided on broadcast quality video cameras.

In accordance with a second aspect of the present invention, there is provided a programmable optical filter comprising:
(i) an array of optical filter elements with controllable transmission coefficients; and
(ii) control means for selectively programming a transmission coefficient for respective optical filter elements.

The array or programmable filter elements can, for example, be in the form of an array of liquid crystal elements.

In accordance with a third aspect of the invention, there is provided an integrated image sensor comprising:
(i) a 2-D array of sense elements arranged in rows and columns;
(ii) a plurality of output lines, one for each column;
(iii) a plurality of threshold detectors associated with respective output lines;
(iv) a plurality of attenuators associated with respective threshold detectors; and
(v) storage for at least one row of processed image signals.

The above, and other objects, features and advantages of this invention will be apparent from the following detailed description of illustrative embodiments which is to be read in connection with the accompanying drawings.

DESCRIPTION OF THE PREFERRED EMBODIMENTS

Conventional television broadcasting systems are adapted to accommodate a range of image intensity values corresponding to an exposure range of about four to five iris stops. The image intensity values are represented by voltage levels. The voltage levels used in conventional broadcast systems are in a range of a one volt, 0.3 of a volt of which is used to provide synchronising signals, and 0.7 of a volt which is used to provide the image intensity values. A colour system processes separate colour components in order that a colour image can be produced. For ease of explanation, however, in the following description the production of monochrome signals will be discussed, however, it will be apparent that the invention applies equally to a colour system.

Figure 1:
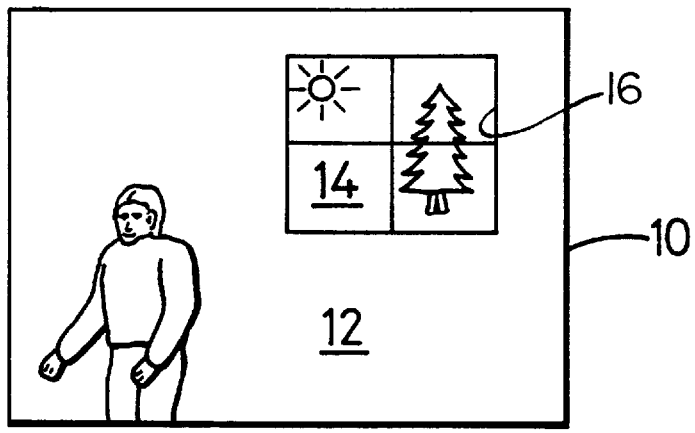
FIG. 1 is a schematic representation of a typical scene.
Figure 2:
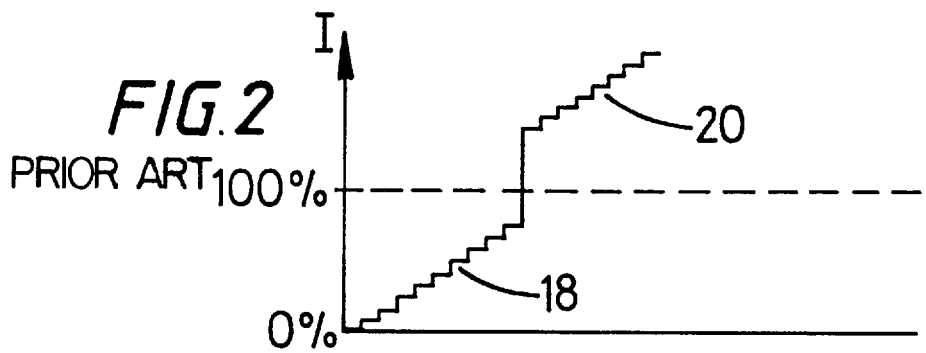
FIG. 2 represents a set of image intensity values to be found in the scene of FIG. 1.

FIG. 1 is a schematic view of a scene 10 to be captured by a camera. The foreground scene 12 is within a room, lit by artificial lighting. The background 14 of the scene is seen through a window 16. FIG. 2 represents the range of grey scale or intensity values which exist within this scene. The stepped portion 18 corresponds to the intensity values to be found within the room, i.e in the foreground of the scene. The range of intensity values 20 corresponds to the intensity values to be found through the window, i.e. in the background of the scene. Typically, the sensor of a video camera, whether it be a tube, a CCD type device, or the like is able to detect the full range of intensity values. However, because of the broadcast standards in use, the television camera is only able to output intensity values within a range of about four to five iris stops represented by the range between zero and one hundred percent in FIG. 2. It can be seen, in the example shown in FIGS. 1 and 2 that the signal output by a conventional television camera will not, therefore, be able to resolve the detail of the background having the range of intensity values 20. In the signals output by the television camera, this portion of the image is clipped.

Figure 3:
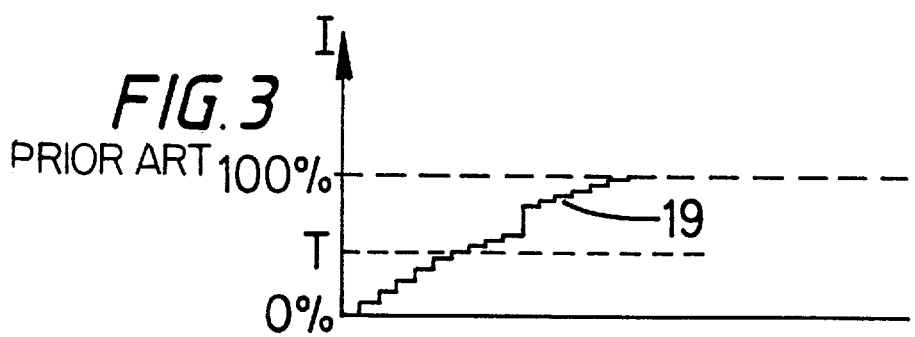
FIG. 3 represents a prior art approach to accommodating a range of intensity values as illustrated in FIG. 2.

FIG. 3 represents one attempt to overcome the problems of clipping through the use of compression curves. As can be seen in FIG. 3 a scaling factor is applied to intensities between a threshold value T and the maximum intensity value within the image to map that range of values to the range between the value T and the maximum value which can be accommodated by the broadcast system, as represented by the line 19. It can be seen, however, that this approach results in a degradation of the resolution of intensity levels towards the brighter end of the range.

Figure 4:
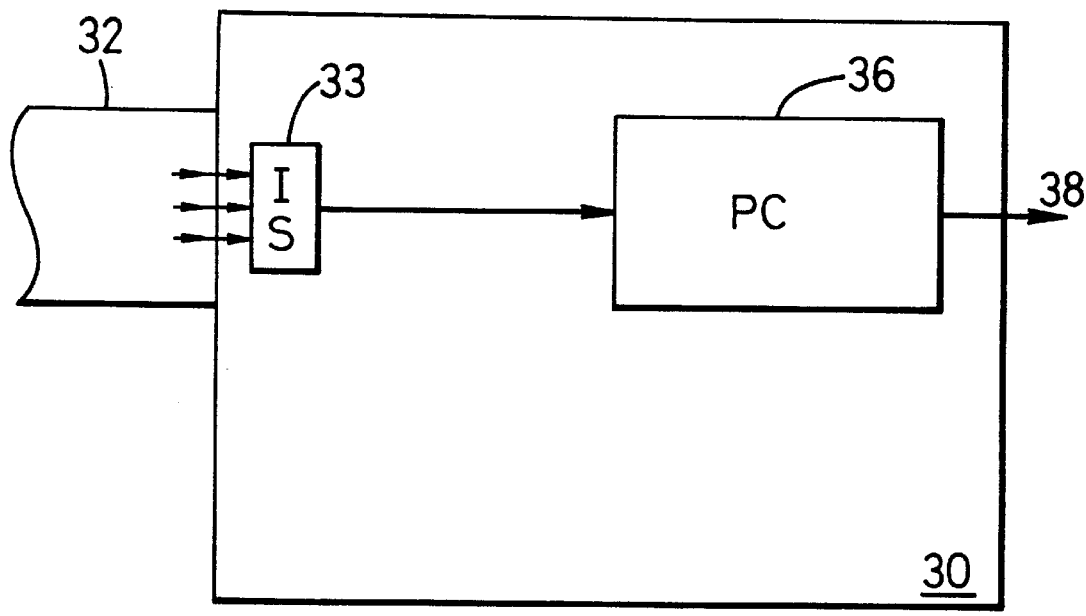
FIG. 4 is a schematic block diagram of a conventional television camera.

FIG. 4 is a schematic representation of a conventional television camera 30. The television camera 30 comprises an optical system 32 which directs radiant energy such as light from a scene being viewed onto a image sensor 33. A known image sensor 33 comprises an array of sensor elements (for example CCD sensor elements) and temporary storage for a captured image field. Signals sensed by the image sensor 33 are processed by processing circuitry 36 to produce output image signals 38 for broadcast and/or for storage on a video tape recorder or the like. The image sensor 33 is able to accommodate an exposure range greatly exceeding the four to five iris stops which can be accommodated by the television broadcast system for which the camera is intended. The processing circuitry 36 provides clipping and/or compression of the sensed image data for producing the output image signal 38 so that the video image signals 38 conform to the television standard.

As described above, a conventional television camera is not able adequately to deal with images having an exposure range significantly in excess of four to five iris stops and, in particular, an image containing an exposure range including a step in exposure values as illustrated in FIG. 2.

Figure 5:
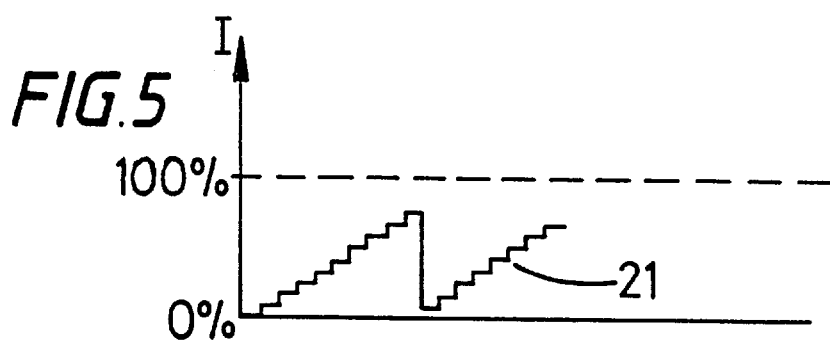
FIG. 5 illustrates the approach adopted by image capture apparatus in accordance with the invention to accommodating a range of intensity values such as those illustrated in FIG. 2.

Image capture apparatus, such as a video camera, in accordance with the invention, is able to accommodate images including a range of exposure values significantly in excess of four to five iris stops. It does this by identifying areas of the image sensor at which the incident intensity exceeds a predetermined intensity value and by causing a change in the image signals corresponding to that area 21 (equivalent to applying a negative offset to those signals), as illustrated in FIG. 5. In the example of the scene shown in FIG. 1, for example, this would result in the foreground and the background of the image being displayed within the same exposure range, with the results that the detail in both the foreground and the background would be resolved in the signals output by the video camera.

Figure 6:
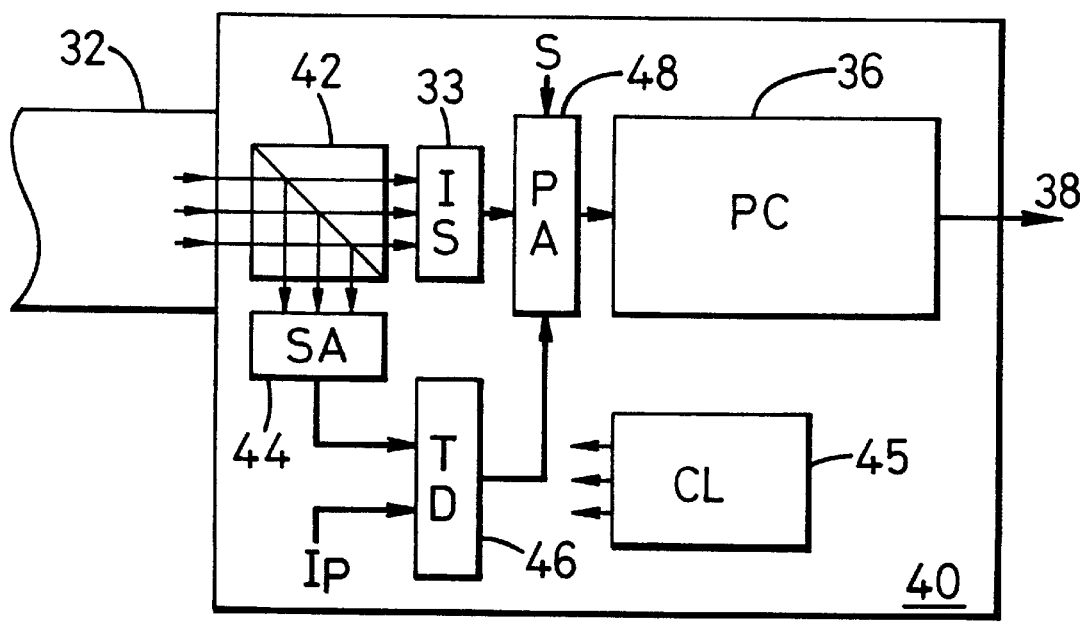
FIG. 6 is a schematic block diagram of one embodiment of an image capture apparatus in accordance with the invention.

FIG. 6 illustrates one embodiment of an image capture apparatus in accordance with the invention. FIG. 6 illustrates a television camera 40 which, in addition to an image sensor 33, comprises a sense array 44. The image sensor 33 can be a conventional prior art image sensor. The sense array 44 can also be a conventional image sensor. However, it need not be of the same resolution as the image sensor 33. Also, in the case of a colour camera, where the image sensor 33 comprises separate sensors for each colour component, the sense array 44 need only be a monochrome image sensor. In order to provide the light to the image sensor 33 and the sense array 44, an optical splitter 42 is provided in the optical path to the image sensor 33 to divert light to the sense array 44. Connected to the sense array 44 is a threshold detector 46. The threshold detector operates to identify areas of the image in which the incident light intensity exceeds a predetermined value. This can be done in the detector 46 by a simple threshold device which senses those pixels for which a sample signal is output from the sense array 44, which sample signal has a signal value (i.e. a voltage level) representative of an incident intensity exceeding a predetermined intensity.

Figure 7A:
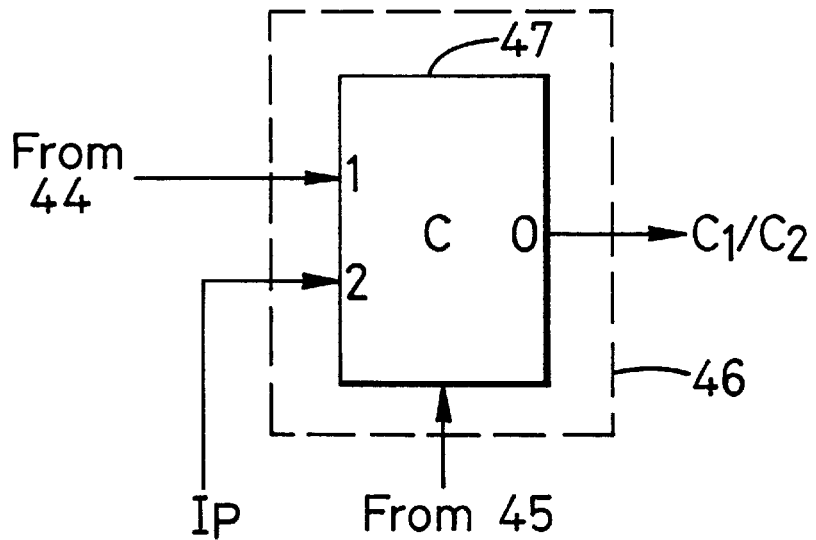
FIG. 7A is a schematic block diagram of a threshold detector used in the apparatus of FIG. 6.

FIG. 7A illustrates schematically such a simple threshold detector 46. The threshold detector 46 comprises a comparator 47. The comparator 47 receives at a first input sample image signals (i.e. voltages) generated by scanning the sense array 44. The comparator 47 receives at a second input a signal $I_p$ representing a predetermined threshold intensity level P. The comparator produces at its output control signals $C_1$ and $C_2$. The comparator receives control clocking signals from the control logic 45 (FIG. 6). The predetermined intensity signal $I_p$ is preferably a voltage generated from a control potentiometer operable by a user of the video camera. In this way, the user of the video camera is able to adjust the threshold to accommodate different scenes being viewed. However, the predetermined intensity signal $I_p$ could alternatively be hard wired, or generated by an automatic compensation circuit (not shown).

The threshold detector 46, illustrated in FIG. 7A produces a first control signal $C_1$ when the image signals received from the sense array 44 are representative of an incident image intensity exceeding that represented by the predetermined intensity signal $I_p$. The threshold detector 47 alternatively produces an output signal $C_2$ when the signal from the sense array 44 is representative of an incident image intensity less than the predetermined intensity P. The predetermined intensity level signal $I_p$ preferably corresponds to the 100% level illustrated in FIG. 5.

In an alternative embodiment, the threshold detector may operate in a more complex manner to compare pixels over a larger area of the image to establish areas within the image for which the incident image intensity of a significant number of pixels and/or the average incident intensity value exceeds the threshold intensity. In this case, the control logic of the threshold detector will be more complex, integrating the image over a larger area. In either case, the output of the threshold detector, will produce a control signal $C_1$ or $C_2$ for each pixel signal output by the image sensor 33.

In either case, the output of the threshold detector 46 is synchronised with the operation of the sensor 33 so as to produce control signals therefrom in synchronisation with the output of corresponding image signals from the sensor 33. The threshold detector 46 thus-outputs a first control signal $C_1$ for each pixel within areas of the sensed image where the incident image intensity exceeds the threshold value and a second control signal $C_2$ for each pixel within the sensed image where the incident image intensity does not exceed that threshold.

A programmable attenuator 48 responds to the first control signal $C_1$ from the threshold detector 46 to attenuate the image signals (the voltages) from the sensor 33 which correspond to the areas where the incident intensity exceeds the threshold and responds to the second control signal $C_2$ not to attenuate the other image signals received.

Figure 7B:
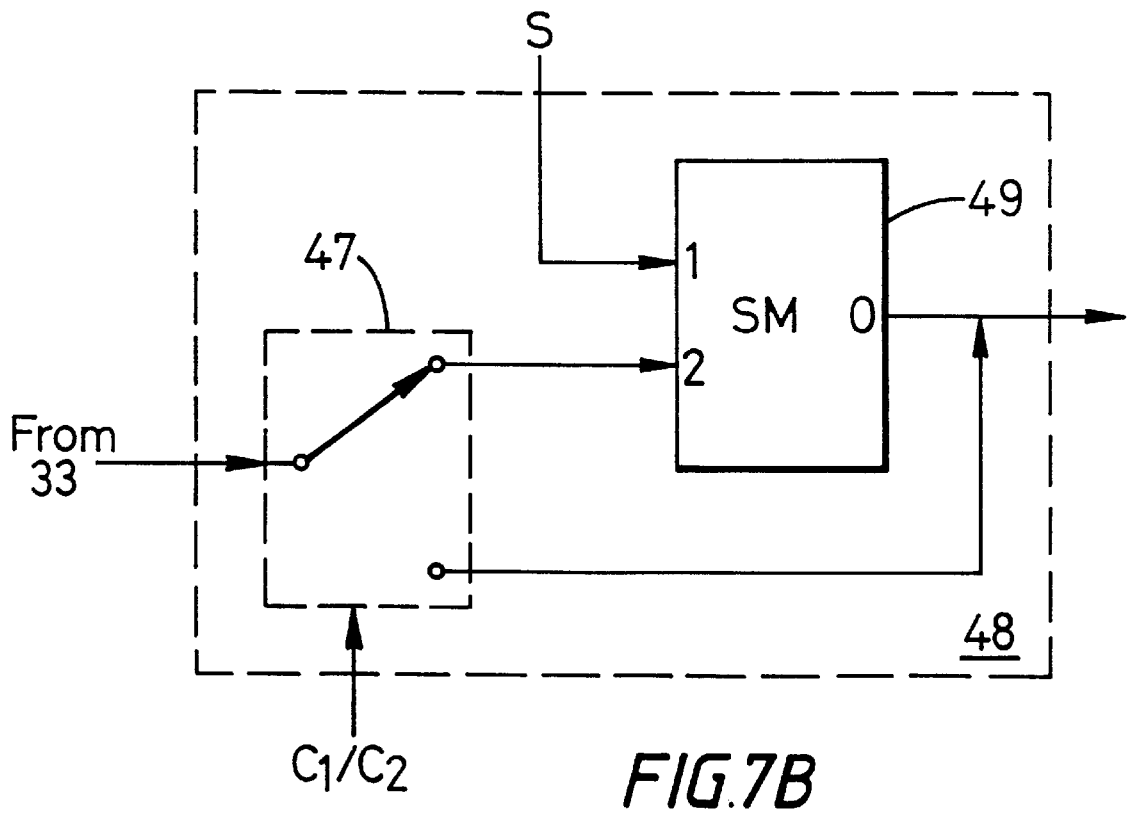
FIG. 7B is a schematic block diagram of a programmable attenuator used in the embodiment of FIG. 6.

FIG. 7B is a schematic representation of the programmable attenuator 48. The programmable attenuator comprises a signal modifier 49 for stepping down a signal received at a first input thereof. The degree by which the input signal is stepped down is determined by a control signal S supplied at a second input of the signal modifier 49. Conveniently, the signal modifier can be implemented by an operational amplifier for which the first input is the positive input and the second input is the negative input. The control signals $C_1$–$C_2$ are used to control a switch 47. Thus, image signals received from the image sensor 33 are directed by the switch 47 to the programmable attenuator 49 on receipt of a control signal $C_1$ from the threshold detector 46 indicating that the received signal from the sensor 33 is representative of an image intensity exceeding the predetermined incident intensity P. Such signals are then stepped down by the amount determined by the control signal S. Image signals received from the image sensor 33 when a control signal $C_2$ is supplied by the threshold detector 46 are channelled by the switch 47 so as to bypass the signal modifier 49 and to emerge from the programmable attenuator unamended.

The effect of the programmable attenuator 48 is, therefore, to apply a negative pedestal to a range of intensity values for the image signals within the areas specified by the threshold detector 46 to step down or shift that range of intensity values by a selected amount determined by control signals. Preferably, user input means, such as a potentiometer on the camera, are provided for enabling the amount by which the input signals are attenuated to be selected. However, it is envisaged that automatic setting of the value could also be employed. The signal output by the programmable attenuator 48 can be further processed in the conventional way, eg. through the use of compression algorithms, by the processing circuitry 36.

Figure 8:
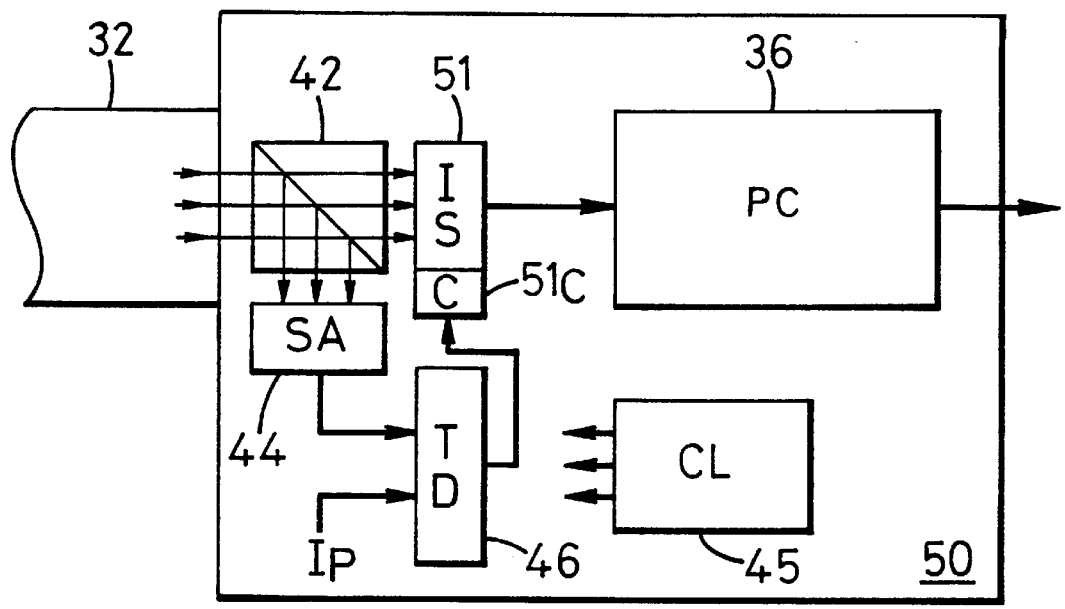
FIG. 8 is a schematic block diagram of a second embodiment of image capture apparatus in accordance with the invention.

FIG. 8 illustrates a second embodiment of image capture apparatus 50 in accordance with the invention. In this example, the components 42, 44 and 46 correspond to those in the embodiment of FIG. 6. However, in this embodiment, an image sensor 51 is provided which comprises individually programmable sense elements. In the preferred embodiment, the image sensor 51 comprises an array of charge coupled devices, for which the integration times are individually selectable and associated control circuitry. However, other equivalent or similar technology could be used for the sense devices. In this case, therefore, the control signals output by the threshold detector 46 are used to cause the control circuitry 51C of the image sensor 51 to change dynamically the integration times of the sense elements in the image sensor 51 so as to step down the image signals output by the image sensor 51 corresponding to elements in the image sensor at which the incident light intensity exceeds the predetermined intensity value.

Figure 9:
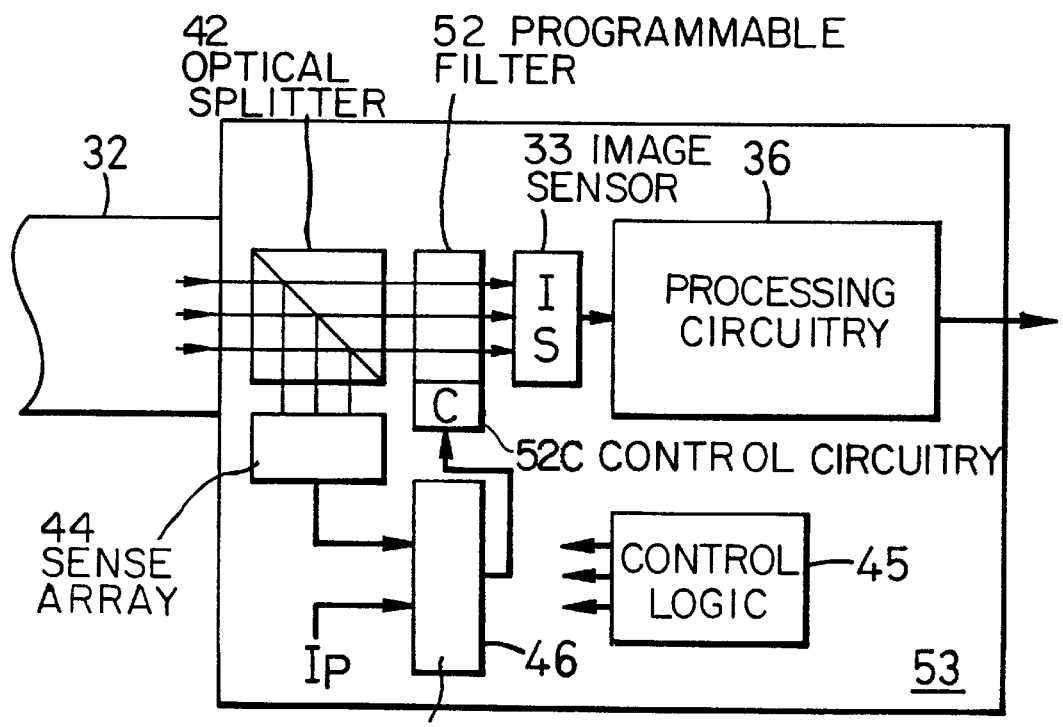
FIG. 9 is a schematic block diagram of a third embodiment of image capture apparatus in accordance with the invention.

FIG. 9 represents a third embodiment 53 of the present invention. In this embodiment, the sensor 33, can be substantially the same as the sensor 33 of the embodiment of FIG. 6 and of the prior art in FIG. 4. In this embodiment, in order to step down the output signal for sense elements in the image sensor 33 for which the incident light exceeds the predetermined value, a programmable filter 52 is provided. The control signals $C_1/C_2$ output by the threshold detector 46 are used to cause the control circuitry 52C of the programmable filter to adjust the transmission coefficients for those areas of the filter at which the intensity exceeds the aforementioned predetermined value. The programmable filter is preferably implemented in the form of a liquid crystal display, or the like, where individual elements in the display can be set to different transmission values.

Figure 10:
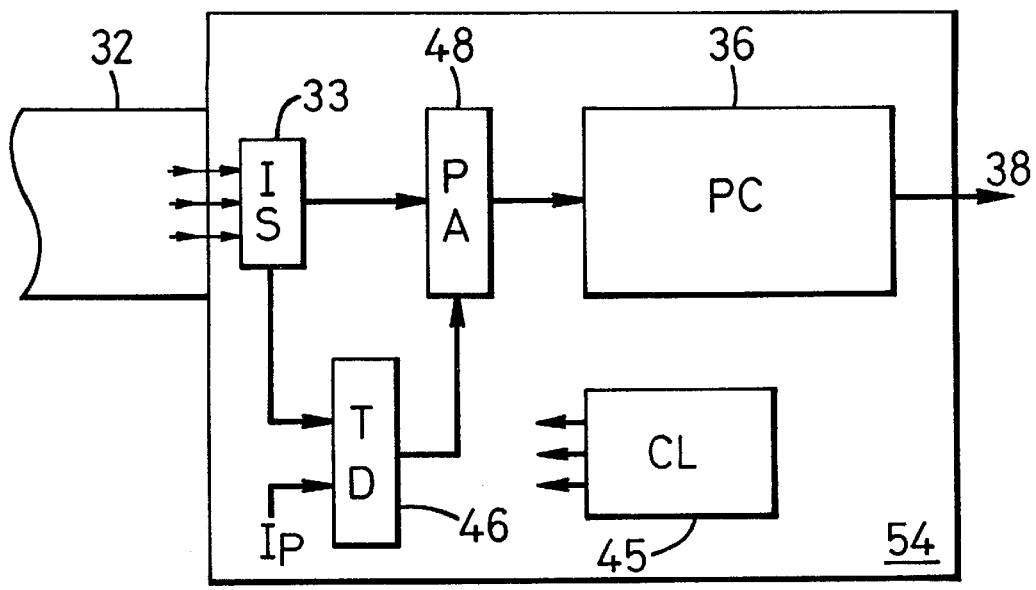
FIG. 10 is a schematic block diagram of a fourth embodiment of image capture apparatus in accordance with the invention.

FIG. 10 illustrates a further embodiment 54 of the invention which does not require the provision of the additional sensor array 44. In this embodiment, the output from the image sensor 33 is sensed directly by the threshold detector 46 in order to determine the gating of the programable attenuator 48.

Figure 11B:
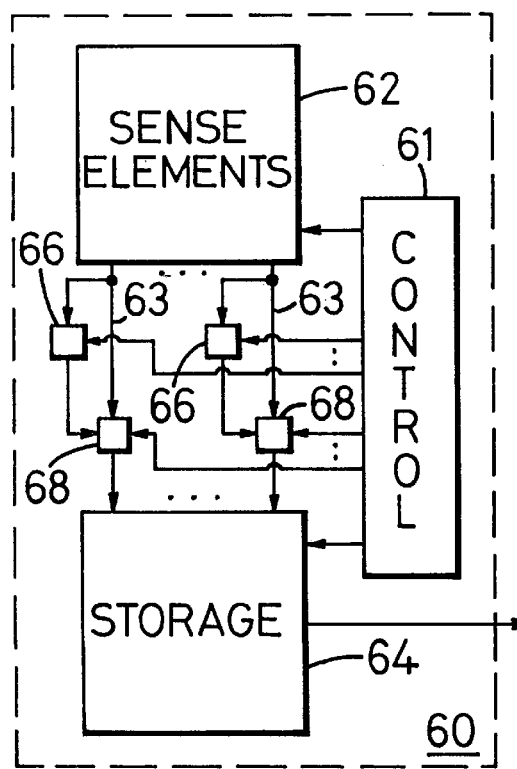
FIGS. 11A and 11B are schematic block diagrams of a fifth embodiment of image capture apparatus in accordance with the invention.
Figure 11A:
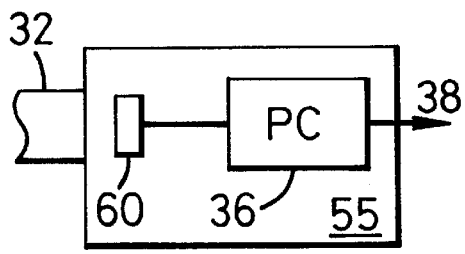

FIG. 11A illustrates yet a further embodiment 55 of the invention employing a modified image sensor 60. The image sensor 60, which is illustrated in more detail in FIG. 11B, comprises an array 62 of sense elements arranged as rows and columns with one output line 63 for each column of the sensor array. The array of sense elements is read row by row into storage 64 associated with the array of sense elements. Inserted in the output lines 63 from the array 62 of sense elements to the storage are a plurality of threshold detectors 66 and programmable attenuators 68. The programmable attenuators 68 are operable to provide a selected degree of attenuation to those signal values output on the lines 63 which are detected by the threshold detector means 66 to exceed the predetermined intensity value. The scanning of the array of sense elements 62 and the subsequent storage in the storage 64 is under the control of control logic 61. The whole of the image sensor 60 could be integrated as a single integrated package.

Figure 12:
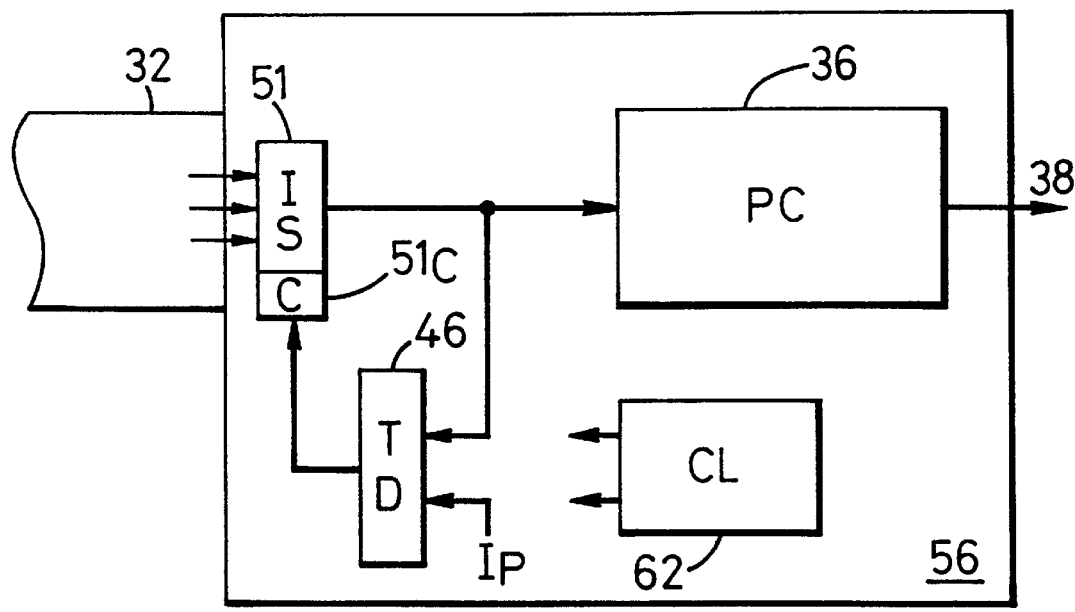
FIG. 12 is a schematic block diagram of a sixth embodiment of an image capture apparatus in accordance with the invention.

FIG. 12 illustrates a further example of an image capture apparatus 56 in accordance with the invention. In this example, threshold detection logic 46 is responsive to the output from an image sensor comprising an array of image sense elements with individually controllable integration times. In this example, control logic 62 in combination with control circuitry 51C in the image sensor 51 causes the integration time of all the sense elements to be set to a reference integration time during a calibration period when the image capture apparatus is not outputting active image signals. During this calibration period, the threshold detector is responsive to the image intensity integrated on the sense elements to determine areas at which the incident radiation intensity exceeds a predetermined amount. The threshold detection logic 46 is then operative to step down, for a subsequent active output period during which an image signal is output, the integration time of sense elements at which the instant intensity exceeded the predetermined intensity during the calibration period.

Figure 13:
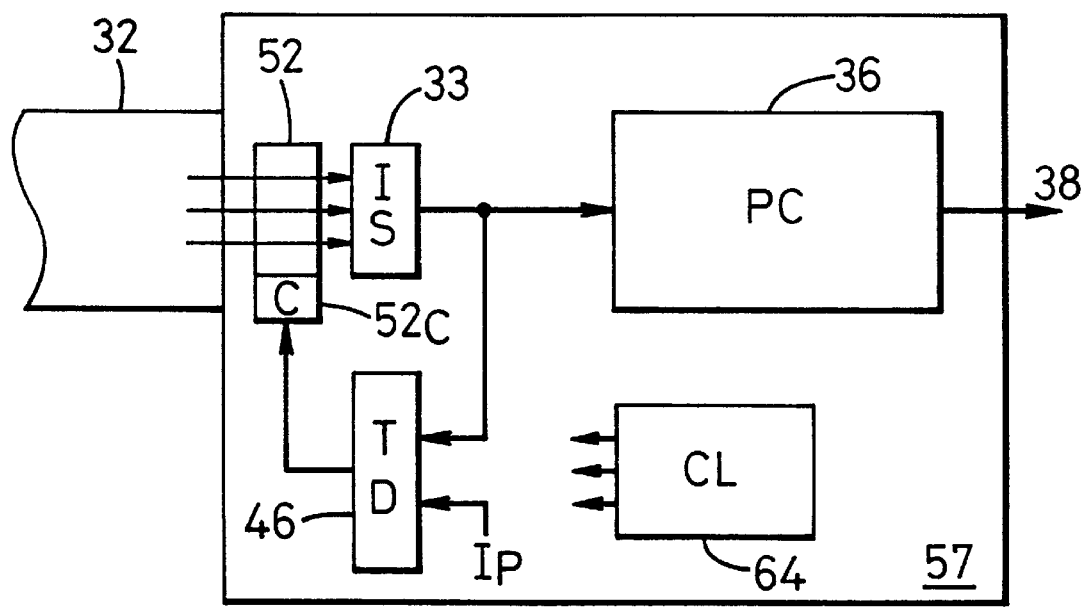
FIG. 13 is a schematic block diagram of a seventh embodiment of an image capture apparatus in accordance with the invention.

FIG. 13 illustrates a further example of image capture apparatus 57 in accordance with the invention. In the example shown in FIG. 14, the output from an image sensor 33 corresponding to that illustrated in FIG. 6 and in the prior art, is input to a threshold detector 46. Control means 64 is provided which, in combination with control circuitry 52C in the programmable filter 52, causes the programmable filter 52 to be set to full transmissivity during a calibration period when the image capture apparatus is not outputting an image signal, the control means being responsive to signals output by the threshold detector 46 during a calibration period to step down for a subsequent active output period during which an image signal is output, the transmission coefficients at locations corresponding to areas of the sensed image at which the image intensity exceeds the predetermined intensity.

Figure 14:
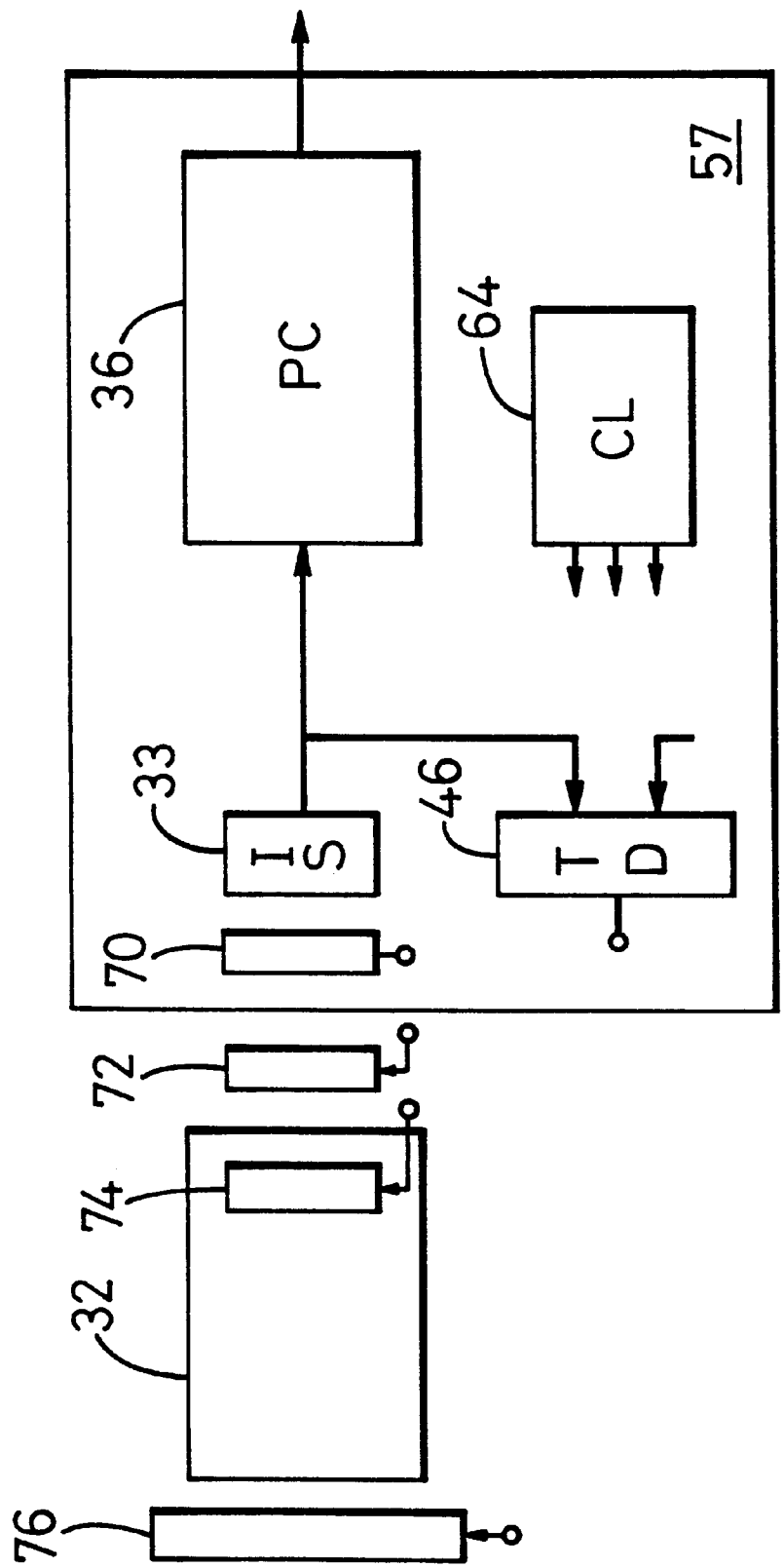
FIG. 14 is a schematic block diagram illustrating various positions for the location of a programmable filter for the embodiment of FIG. 13.

The programmable filter 52, is preferably inserted immediately before the image sensor 33. However, the image sensor could be placed at alternative positions in the optical path from the scene being viewed by the image sensor. FIG. 14 illustrates these various positions. Reference 70 illustrates the preferred position immediately before the image sensor, reference 72 illustrates a position between a camera body and an interchangeable lens. Reference 74 illustrates a position in an interchangeable lens and reference 76 illustrates a position in front of an interchangeable lens.

There has been described an image capture apparatus comprising an image sensor for producing image signals representative of radiation intensity incident on respective portions of the sensor with a means for automatically identifying areas of the sensor for which the incident intensity exceeds an intensity which can be accommodated within a television broadcast system, and means for causing a stepped change in image signals corresponding to such an area to provide image signals which can be accommodated by the broadcast system. Of those specific embodiments of the invention have been described hereinabove, it will be appreciated that many additions and/or modifications are possible within the scope of the present invention.

For example the programmable filter could be incorporated as an integral part of an integrated image sensor with the array of optical filter elements of the programmable filter overlying the array of sense elements of the image sensor. The array of filter elements (e.g. LCD elements) could be formed as a set of further layers of integration over those for the sense elements.

Also, the programmable filter 52, is not limited in its application merely to automatic control by the threshold detector 46. The control of the programmable filter, could additionally, or alternatively, be provided from a pre-programmed look-up table read only memory or from a separate computer device, such as a personal computer. Equally, the programmable filter could find application for other images capture devices, such as moving film cameras, or still cameras. The programmable filter is preferably in the form of a programmable array such as an LCD shutter. In the preferred embodiment, the programmable filter provides changes in grey scale values. However, if a programmable colour array (e.g. a colour LCD) is used, the programmable filter could also provide colour filter effects. Also, with selective activation of individual filter elements within the programmable filter, other effects can be generated.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Image capture apparatus for producing video image signals, comprising:

image sensor means for producing video image signals having voltage levels representative of radiation intensities incident on respective areas of said image sensor means;

means for identifying those respective areas of said image sensor means at which the incident radiation intensity exceeds a predetermined intensity and for producing a control signal representative thereof; and means responsive to said control signal for selectively causing a reduction in the voltage levels of said video image signals corresponding to said respective areas, which reduction is equivalent to applying a negative offset to said video image signals.

2. An image capture apparatus as claimed in claim 1 wherein the means for identifying those respective areas of the image sensor means at which the incident radiation intensity exceeds a predetermined intensity includes threshold detection means responsive to the video image signals output by the image sensor means for detecting voltage levels exceeding a predetermined level as indicative of an incident radiation intensity exceeding the predetermined intensity.

3. An image capture apparatus as claimed in claim 2 comprising attenuation means responsive to the threshold detection means selectively to reduce a voltage level representative of an incident radiation intensity exceeding the predetermined intensity to produce a reduced voltage level representative of a radiation intensity below the predetermined intensity.

4. An image capture apparatus as claimed in claim 3 wherein the attenuation means is operative to pass unaltered a video image signal having a voltage level representative of a radiation intensity below the predetermined intensity.

5. An image capture apparatus as claimed in claim 3 wherein the image sensor means is a scanned sensor producing signals for a 2-D array of pixels, the image sensor means comprising a plurality of output lines for respective pixel positions along a scan line, and wherein the threshold detection means comprises a plurality of threshold detectors associated with respective output lines and the attenuation means comprises a plurality of attenuators associated with respective threshold detectors.

6. An image capture apparatus as claimed in claim 3 comprising storage means connected to the output of the attenuation means for storing the processed image signals.

7. An image capture apparatus as claimed in claim 2 wherein the image sensor means comprises an array of sense elements having respective image integration times of which are controllable, the image capture apparatus comprising control means responsive to the threshold detection means indicating an incident radiation intensity exceeding the predetermined intensity selectively to reduce the integration time of the respective sense element or elements at which the incident radiation intensity exceeds the predetermined intensity.

8. An image capture apparatus as claimed in claim 2 comprising a programmable optical filter interposed in the optical path preceding the image sensor means, and control means for causing the programmable optical filter to be set to a selected transmission coefficient during a calibration period when the image capture apparatus is not outputting a video image signal, the control means being responsive to signals output by the threshold detection means during a calibration time to reduce, for a subsequent active output period during which a video image signal is output, the transmission coefficient of the programmable optical filter at locations corresponding to areas of the sensed image at which the radiation intensity exceeds the predetermined intensity.

9. An image capture apparatus as claimed in claim 8 wherein the programmable optical filter is located between the image sensor means and optical elements in the optical path.

10. An image capture apparatus as claimed in claim 8 wherein the programmable optical filter comprises an array of liquid crystal elements.

11. The image capture apparatus as claimed in claim 1 comprising sense array means responsive to said radiation for producing sample signal values representative of the radiation intensities incident on the respective areas of the image sensor means, wherein the means for identifying comprises threshold detection means responsive to said sample signal values to indicate an incident radiation intensity exceeding the predetermined intensity.

12. The image capture apparatus as claimed in claim 11 comprising beam splitter means in an optical path preceding the image sensor means for diverting from said optical path part of the incident radiation onto the sense array means.

13. An image capture apparatus as claimed in claim 11 comprising attenuation means responsive to the threshold detection means selectively to reduce a voltage level representative of an incident radiation intensity exceeding the predetermined intensity to produce a reduced voltage level representative of a radiation intensity below the predetermined intensity.

14. An image capture apparatus as claimed in claim 13 wherein the attenuation means is operative to pass unaltered a video image signal having a voltage level representative of a radiation intensity below the predetermined intensity.

15. An image capture apparatus as claimed in claim 13 wherein the image sensor means is a scanned sensor producing signals for a 2-D array of pixels, the image sensor means comprising a plurality of output lines for respective pixel positions along a scan line, and wherein the threshold detection means comprises a plurality of threshold detectors associated with respective output lines and the attenuation means comprises a plurality of attenuators associated with respective threshold detectors.

16. An image capture apparatus as claimed in claim 11 comprising storage means connected to the output of the attenuation means for storing the processed image signals.

17. An image capture apparatus as claimed in claim 11 wherein the image sensor means comprises an array of sense elements having respective image integration times of which are controllable, the image capture apparatus comprising control means responsive to the threshold detection means indicating an incident radiation intensity exceeding the predetermined intensity selectivity to reduce the integration time of the respective sense element or elements at which the incident radiation intensity exceeds the predetermined intensity.

18. Image capture apparatus as in claim 11, further comprising a programmable optical filter having an array of optical filter elements with programmable transmission coefficients in an optical path preceding the image sensor means, and control means responsive to the threshold detection means indicating an incident radiation intensity exceeding the predetermined intensity selectively to reduce the transmission coefficient of the programmable optical filter at locations corresponding to the area of the image sensor means at which the incident radiation intensity exceeds the predetermined intensity.

19. Image capture apparatus as in claim 18, wherein the programmable optical filter is located between the image sensor means and optical elements in the optical path.

20. Image capture apparatus as in claim 18, wherein the programmable optical filter includes an array of liquid crystal elements.

21. The image capture apparatus as claimed in claim 1 wherein the image sensor means comprises an array of charge coupled device elements.

22. The image capture apparatus as claimed in claim 1 wherein said respective areas correspond to a pixel resolution of the image sensor means.

23. The image capture apparatus as claimed in claim 1 wherein the image capture apparatus is a video camera.

24. Image capture apparatus as in claim 1, in which said means responsive to said control signal for selectively causing the reduction in the voltage levels of said video image signals includes a programmable optical filter through which said radiation is incident on said image sensor means.

25. A programmable optical filter for use in an image capture apparatus as in claim 1, comprising an array of optical filter elements with controllable transmission coefficients.

26. The programmable optical filter as in claim 25, further including an array of liquid crystal elements.

27. Image capture apparatus as in claim 1, in which said means responsive to said control signal for selectively causing the reduction in the voltage levels of said video image signals includes a programmable attenuator coupled to receive said video image signals and responsive to said control signal for selectively causing a reduction in the voltage levels of said video image signals corresponding to said respective areas.

* * * * *